Dec. 11, 1945. H. PFENNINGER 2,390,959
GAS TURBINE POWER PLANT
Filed Jan. 19, 1942

Inventor:
Hans Pfenninger
By Pierce & Scheffler
his Attorneys.

Patented Dec. 11, 1945

2,390,959

UNITED STATES PATENT OFFICE 2,390,959

GAS TURBINE POWER PLANT

Hans Pfenninger, Baden, Switzerland, assignor to Aktiengesellschaft Brown, Boverie & Cie., Baden, Switzerland, a joint-stock company Application January 19, 1942, Serial No. 427,394
In Switzerland February 3, 1941

2 Claims. (Cl. 60—41)

Pressure firing systems in which the combustion air compressor is driven by a gas turbine and the total amount of air supplied by the compressor is passed through the combustion chamber, can be comparatively easily started, run up and maintained at no-load. With gas turbines, however, where only a small portion of the air is passed through the combustion chamber and the major portion used as cooling air, certain difficulties are encountered when running up and when operating at no-load. The reason for this is that with small loads the distribution radio changes so that too little air flows into the combustion chamber and too much air into the cooling channels. Thus only a small amount of fuel can be burnt and combustion is incomplete, because in the comparatively narrow combustion spaces there is not the necessary velocity and turbulence for good combustion.

It is of course possible to throttle the inlet passage to the cooling channels and thus force the air to flow in larger quantities to the combustion chamber, but this throttling causes an additional resistance which has to be overcome by the starting motor because the output of the gas turbine is not adequate for running the machine up from the cold condition. The same applies to no-load operation which has to take place with a minimum fuel consumption and without auxiliary motor.

Now in order to be able to run up rapidly and to maintain smokeless combustion both at full speed and no-load despite the small power of the starting motor, it is proposed in accordance with the present invention to provide an auxiliary blower with a separate drive by means of which during running up or no-load operation that part of the air serving as combustion air is drawn from the main air stream and brought up to a higher pressure. With this auxiliary blower the proportion of combustion air to cooling air can be changed within wide limits and the combustion air given the desired flow velocity, without inflicting on the gas turbine the power demand which is necessary when the major portion of the air is throttled.

Figure 1:
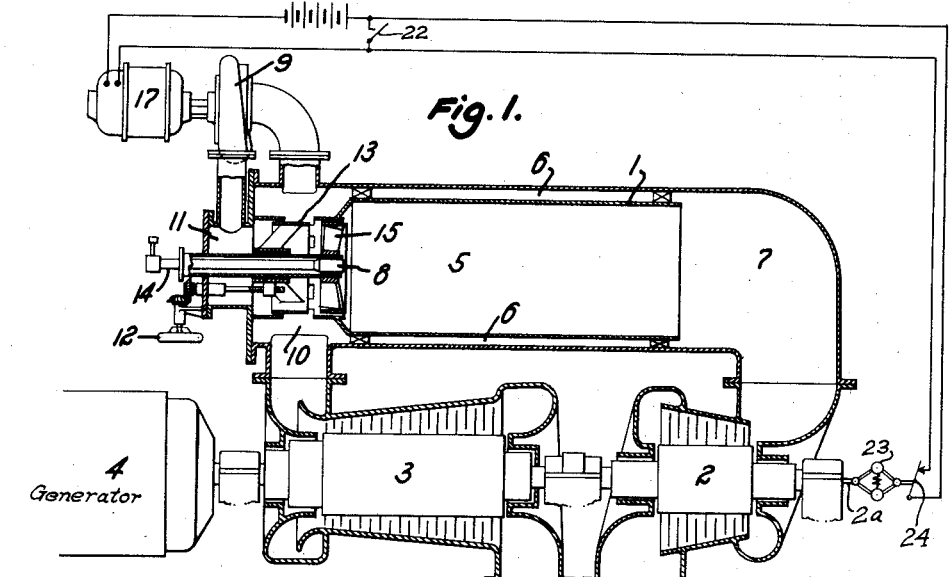
Figure 2:
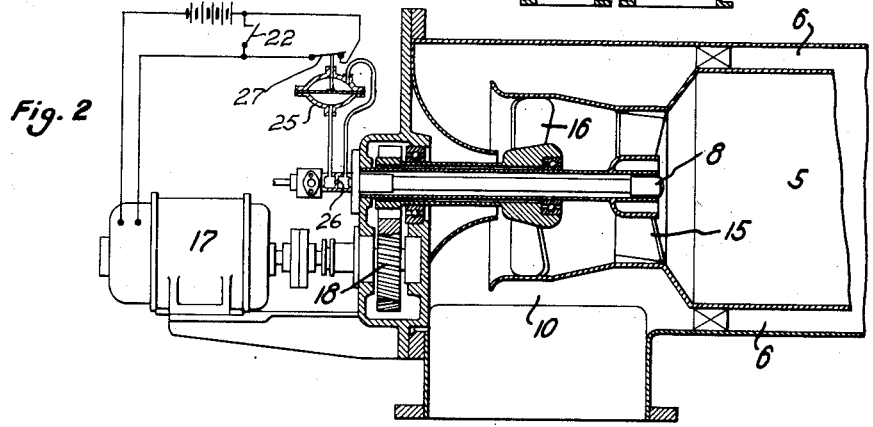
Figure 3:
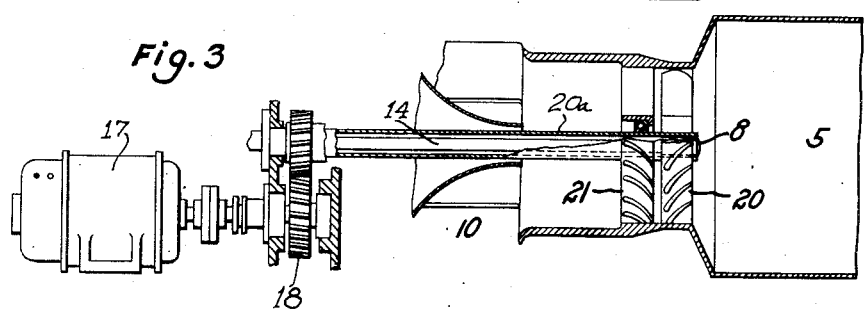

In the accompanying drawing Fig. 1 shows diagrammatically the general arrangement of the plant. Figs. 2 and 3 show two different constructional examples of the auxiliary blower.

1 indicates the combustion chamber, 2 the gas turbine, 3 the compressor and 4 the current generator. The combustion chamber consists of the usual elements for gas turbines with air cooling, namely the combustion space 5, the cooling space 6 and the mixing chamber 7. Whilst only slightly more air than is necessary for the combustion of the fuel is passed into the combustion space, several times the amount of combustion air must be passed through the cooling space in order that the moderate temperature required for the blades of the turbine be attained in the mixing chamber. The distribution ratio of combustion air to cooling air is fixed by the cross-sectional areas and resistances which determine the velocity required at the burner exit 8 in order to obtain complete combustion and the amount of cooling air required for a sufficiently high cooling effect (heat transfer) at the combustion space casing. This distribution ratio which automatically adjusts itself is adequate for a wide range of loads, but will be disturbed when the load is very small, that is when very little air is used and the pressure is low. This is the case when starting the plant, when running up and at no-load. According to the invention therefore a blower 9 is provided which is for instance driven by an electromotor 17. This blower takes air either from the delivery conduit of the compressor or from space 10 and delivers it at a higher pressure into the burner casing 11, which during the operation of the blower is separated from space 10 and the cooling air inlet by a valve 13 operated by a handwheel 12 or mechanically. Since less cooling is required with the small heat consumption during starting and for no-load operation, the major portion of the air delivered by compressor 3 can be withdrawn by the auxiliary blower and used for the combustion of a correspondingly larger quantity of fuel. The fuel is introduced through pipe 14. The air receives the required turbulent movement from the swirling element 15.

The auxiliary blower can be built into the burner casing. The valve which separates the combustion air from the cooling air is then no longer necessary. In Fig. 2 the blower is indicated by the reference numeral 16 and the motor by 17. A gearing 18 ensures that the necessary velocity is attained and enables the fuel nozzle to be located centrally.

The auxiliary blower can also form part of the actual burner and replace the swirling vanes 15 which serve to guide the air and impart a turbulent motion. In Fig. 3 the blower which also serves as a swirling element is indicated by 20 mounted on a hollow shaft 20a which is driven by a motor 17 and gearing 18. 21 is the guide device which at the same time is also used as a bearing for the blower wheel.

In all three embodiments of the invention the auxiliary blower can be stopped as soon as the main compressor 3 has attained a sufficiently high speed to supply the quantity of air required for good combustion and cooling. The motor 17 driving the blower in each case is started manually when the gas turbine is started by closing manual switch 22. After the turbine is started, the manual switch 22 is opened and the operation of the motor 17 may then be controlled automatically in dependence on the speed of the turbine or on the quantity of fuel supplied. In Fig. 1 a governor 23 on an extension 2a of the shaft of the turbine acts to close the motor control switch 24 when the speed falls below a desired point and to open the switch when the speed gets up above such point. In Fig. 2 a diaphragm regulator 25 connected on either side of an orifice 26 in the fuel supply line acts to close motor control switch 27 when the turbine is operating on no-load and to open the same when operating on load, in dependence on the quantity of fuel supplied.

I claim:

1. In a gas turbine power plant including a combustion chamber with forced air cooling, a gas turbine supplied with motive fluid from said combustion chamber and an air compressor driven by said gas turbine, an air chamber adjacent one end of said combustion chamber to which air is supplied by said compressor and from which both cooling air and combustion air for said combustion chamber are withdrawn, a burner casing opening at one end into said air chamber and at its other end into said combustion chamber, an auxiliary blower member mounted in said burner casing, and means for driving said auxiliary blower member.

2. A gas turbine power plant according to claim 1 in which a burner tube extends axially through said burner casing and said auxiliary blower member is disposed coaxially with said burner tube at the inner end of said burner casing whereby to produce a swirling of the combustion air entering said combustion chamber when said auxiliary blower is out of operation.

HANS PFENNINGER.